W. K. BROWNLEE.
GLASS POT.
APPLICATION FILED JAN. 9, 1909.

1,016,065.

Patented Jan. 30, 1912.

Witnesses

Inventor
William K. Brownlee

UNITED STATES PATENT OFFICE.

WILLIAM K. BROWNLEE, OF TOLEDO, OHIO, ASSIGNOR TO THE LIBBY GLASS COMPANY, OF TOLEDO, OHIO, A CORPORATION OF OHIO.

GLASS-POT.

1,016,065.  Specification of Letters Patent.  Patented Jan. 30, 1912.

Application filed January 9, 1909.  Serial No. 471,491.

*To all whom it may concern:*

Be it known that I, WILLIAM K. BROWNLEE, a citizen of the United States of America, residing at Toledo, in the county of Lucas and State of Ohio, have invented certain new and useful Improvements in Glass-Pots, of which the following is a specification, reference being had therein to the accompanying drawings.

This invention relates to new and useful improvements in glass pots, and consists in the construction of a pot—which may be such as ordinarily used—having openings therein above the level of the batch or glass, which will permit the direct heat of the furnace to enter the pot and thus produce a much more rapid melting than has heretofore been possible. These openings are provided with valves so that when the glass is being taken from the pot the heat or flame will not enter pot; all of which is hereinafter more fully described and particularly pointed out in the claims.

Figure 1:
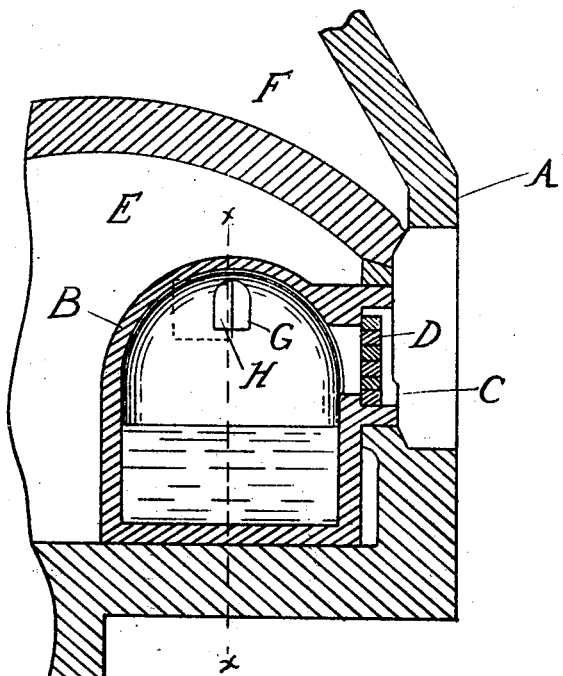
Figure 2:
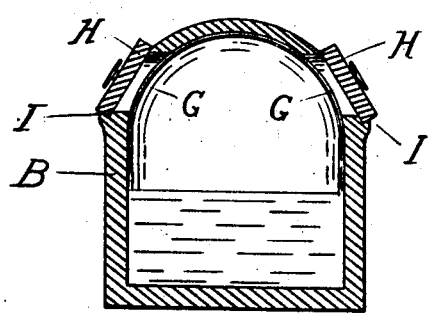

In the drawings: Figure 1 is a vertical section through a portion of a glass-melting furnace and through one of the pots thereof; and Fig. 2 is a section on line *x—x* of Fig. 1.

A represents a portion of an ordinary pot furnace and B the pot therein. The pot has the usual mouth C which, during the heating period, is closed up, as by the brick-work D. It is usual to heat these pots by a flame or heat upon the outside and within the furnace chamber E. It has also been the practice to take heat in through the crown of the furnace and pass it out through a port at a lower point which leads to the stack F. The first of these methods is objectionable because of the time required to melt the glass, and the second is objectionable because the heat, passing into the pot and out of the stack, is lost and cannot be used to pass back in a regenerative furnace for the purpose of heating the brick-work therein. This construction, compared with my improvement, is also slower in time in melting the glass. In each side of the pot near to the top, above the level of the batch or glass, and preferably just above the shoulder or turn of the crown, I provide an aperture G, each being controlled by a valve H which rests upon a shoulder I below the opening, the pot being provided with a flat face at this point so that the valve may be slid back and forth to open or close the opening, as desired, or to open it more or less as occasion required.

Referring to the drawings, during the melting operation, the operator opens the valves H and the heat of the furnace can then pass into the pot on one side and out through the other, and thus obtain a circulation through the pot; but the heat which passes therein and out again enters the chamber E and will pass to the checker-work without being lost up the stack. The valves H may be moved in any suitable manner, but I preferably provide apertures through the wall of the furnace, through which a tool may be inserted for sliding the valve back and forth.

I have been able in practice, with this construction, to melt the glass in the furnace in nineteen (19) hours as against thirty-four (34) hours usually required to accomplish this melting with a pot of the usual construction; and an average of an excess of 25% saving in time in the melting process.

It is desirable to have a circulation of heated air or gas through the pot, and I preferably would construct it as shown in the drawings with apertures upon opposite sides; but it is obvious that if a single aperture is made large enough the heated air or gas may enter the furnace and find exit into the chamber E or back to the regenerative furnace through the same aperture—and thus dispense with the necessity of the two openings for the circulating effect.

What I claim as new and desire to secure by Letters Patent is:

1. In a pot furnace, the combination with a combustion chamber, of a pot therein having an outwardly-opening mouth or working aperture and a plurality of separated apertures communicating with the combustion chamber, and lids or stoppers for the several apertures for alternatively cutting off all exterior and interior communication.

2. In a pot furnace, the combination with the combustion chamber, of a pot therein, said pot having a mouth opening exteriorly of the combustion chamber and a plurality of apertures for establishing communication between the combustion chamber and the interior of the pot, and closers for said mouth and apertures for alternatively closing said pot from all interior and exterior communication.

In testimony whereof I affix my signature in presence of two witnesses.

WILLIAM K. BROWNLEE.

Witnesses:
S. O. RICHARDSON, Jr.,
CHAS. G. ROBB.